US011431691B2

(12) United States Patent
Hill et al.

(10) Patent No.: US 11,431,691 B2
(45) Date of Patent: Aug. 30, 2022

(54) SYSTEMS AND METHODS FOR BLOCKCHAIN-BASED SECURE STORAGE

(71) Applicant: JPMorgan Chase Bank, N.A., New York, NY (US)

(72) Inventors: Eric William Hill, Lewis Center, OH (US); Kevin Philip Hiebel, Lexington, OH (US); Jacob Habel, Lewis Center, OH (US); David Freeman, Powell, OH (US)

(73) Assignee: JPMORGAN CHASE BANK, N.A., New York, NY (US)

( * ) Notice: Subject to any disclaimer, the term of this patent is extended or adjusted under 35 U.S.C. 154(b) by 740 days.

(21) Appl. No.: 16/274,747

(22) Filed: Feb. 13, 2019

(65) Prior Publication Data

US 2020/0259810 A1  Aug. 13, 2020

(51) Int. Cl.
*H04L 29/06*  (2006.01)
*H04L 9/40*  (2022.01)
(Continued)

(52) U.S. Cl.
CPC .......... *H04L 63/065* (2013.01); *G06F 16/137* (2019.01); *G06F 16/152* (2019.01);
(Continued)

(58) Field of Classification Search
CPC . H04L 63/065; H04L 9/0637; H04L 2209/38; H04L 63/123; H04L 67/10; H04L 9/0894; H04L 9/3239; H04L 67/1097; G06F 16/137; G06F 16/152; G06F 16/164; G06F 21/6272; G06F 21/6209

See application file for complete search history.

(56) References Cited

U.S. PATENT DOCUMENTS 10,114,969 B1 * 10/2018 Chaney ................. H04L 9/3247
10,554,405 B1 * 2/2020 Endress ................. H04L 9/088
(Continued)

FOREIGN PATENT DOCUMENTS

CN       107659410       2/2018
KR       20180130249     7/2018

OTHER PUBLICATIONS

International Search Report, dated May 13, 2020, from corresponding International Application No. PCT/US2020/017831.
(Continued)

*Primary Examiner* — Mahfuzur Rahman
(74) *Attorney, Agent, or Firm* — Greenberg Traurig LLP

(57) ABSTRACT

Systems and methods for blockchain-based secure storage are disclosed. In one embodiment, in an information processing apparatus comprising at least one computer processor, a method for blockchain-based secure storage may include: (1) receiving a plurality of data files from a data file source; (2) bundling the plurality of data files into a package; (3) generating a first hash for each file name for each of the plurality of data files, and a second hash for contents of each of the plurality of data files; (4) generating a block comprising the first hash, the second hash, and a reference to a prior block; (5) encrypting each of the plurality of data files in the package; (6) sending the plurality of packages to a storage provider; and (7) committing the block to a distributed ledger.

14 Claims, 2 Drawing Sheets

(51) Int. Cl.
  *G06F 16/16* (2019.01)
  *G06F 16/13* (2019.01)
  *G06F 16/14* (2019.01)
  *H04L 9/06* (2006.01)
  *H04L 9/00* (2022.01)

(52) U.S. Cl.
  CPC .......... *G06F 16/164* (2019.01); *H04L 9/0637* (2013.01); *H04L 9/50* (2022.05)

(56) References Cited

U.S. PATENT DOCUMENTS

2017/0366353 A1* 12/2017 Struttmann ............. G06F 21/64
2018/0323979 A1   8/2018 Ahn et al.
2020/0127842 A1*  4/2020 Winarski ........... H04N 21/2347

OTHER PUBLICATIONS

Written Opinion of the International Searching Authority, dated May 13, 2020, from corresponding International Application No. PCT/US2020/017831.

* cited by examiner

SYSTEMS AND METHODS FOR BLOCKCHAIN-BASED SECURE STORAGE

BACKGROUND OF THE INVENTION

1. Field of the Invention

The present invention generally relates to systems and methods for blockchain-based secure storage.

2. Description of the Related Art

Cyberattacks are becoming more sophisticated and prevalent than ever, with new threat vectors appearing each and every day. In this troubling landscape, it is difficult and cumbersome to guarantee the integrity of data while also guaranteeing the recoverability of the unaltered, original data.

Modern backup and storage solutions often introduce single points of failure due to their centralized designs and implementations. These monolithic, black-box solutions, however, do not provide the data owner the ability to own all aspects of the data lifespan. This means a user must trust in the storage provider to not modify or tamper with the data in any way, and to produce the data in the original, unaltered form when needed. This is a risk that some consumers, especially, large corporations, may not be able to afford.

SUMMARY OF THE INVENTION

Systems and methods for blockchain-based secure storage are disclosed. In one embodiment, in an information processing apparatus comprising at least one computer processor, a method for blockchain-based secure storage may include: (1) receiving a plurality of data files from a data file source; (2) bundling the plurality of data files into a package; (3) generating a first hash for each file name for each of the plurality of data files, and a second hash for contents of each of the plurality of data files; (4) generating a block comprising the first hash, the second hash, and a reference to a prior block; (5) encrypting each of the plurality of data files in the package; (6) sending the plurality of packages to a storage provider; and (7) committing the block to a distributed ledger.

In one embodiment, the data files may be bundled based on a type of data in the data files, a source of data in the data files, an application associated with the data files, a user associated with the data files, etc.

In one embodiment, the method may further include selecting the storage provider from a plurality of storage providers.

In one embodiment, the method may further include combining metadata for a plurality of packages into a capsule; and storing the capsule. The metadata may include a capsule ID, a nonce, a hash of the block, a hash of the prior block, and/or a date and time of capsule creation. The metadata may also include a public key for the capsule. A private key corresponding the public key may be provided to team members to access the metadata.

According to another embodiment, a system for blockchain-based secure storage may include: a data file source; a distributed ledger; a storage provider; and an information processing apparatus comprising at least one computer processor and executing a computer program. The computer program may receive a plurality of data files from a system; bundle the plurality of data files into a package; generate a first hash for each file name for each of the plurality of data files, and a second hash for contents of each of the plurality of data files; generate a block comprising the first hash, the second hash, and a reference to a prior block; encrypt each of the plurality of data files in the package; send the plurality of packages to a storage provider; and commit the block to a distributed ledger.

In one embodiment, the data files may be bundled based on a type of data in the data files, a source of data in the data files, an application associated with the data files, a user associated with the data files, etc.

In one embodiment, the computer program may further select the storage provider from a plurality of storage providers.

In one embodiment, the computer program may further combine metadata for a plurality of packages into a capsule, and may store the capsule. The metadata may include a capsule ID, a nonce, a hash of the block, a hash of the prior block, and/or a date and time of capsule creation. The metadata may also include a public key for the capsule. A private key corresponding the public key may be provided to team members to access the metadata.

BRIEF DESCRIPTION OF THE DRAWINGS

For a more complete understanding of the present invention, the objects and advantages thereof, reference is now made to the following descriptions taken in connection with the accompanying drawings in which.

DETAILED DESCRIPTION OF PREFERRED EMBODIMENTS

Embodiments disclosed herein are directed to systems and methods for blockchain-based secure storage.

As used herein, the terms "blockchain" and "blockchain technologies" encompass technologies such as distributed ledgers that result in immutable and cryptographically-verifiable data storage. Examples include decentralized platforms such as the Ethereum-based platform. The ledgers may be public, private, or a hybrid.

Embodiments use blockchain-based technology to provide data immutability, data resiliency, and decentralization (i.e., no central authority) to enforce such. Although some of features may be achieved with traditional architecture and software, blockchain-based technology adds additional value by ensuring data integrity and immutability, along with providing data owners the ability to manage their data in a decentralized way without having a central governing system/body to manage it for them.

Embodiments are directed to a blockchain-based secure storage system that may guarantee data integrity through decentralization of peers and storage to make data tampering or pollution unfeasible; may be containerized for drag-and-drop, plug-and-play capabilities; may provide redundant storage to any and N-many cloud storage providers, able to push data to any (internal/external) integrated storage provider; may provide decentralized, scalable peer-to-peer networking based on a signed-key trust; may provide data owners the ability to own all aspects of the data lifespan; may guarantee backup and recovery of data; may implement key-based authentication fallback mechanism, providing data recoverability.

Embodiments may provide a decentralized, auditable timeline of events, such as block additions, data storing to storage providers, etc., which provides evidence of data integrity over any given time period and provide evidence when or if data is ever changed.

Figure 1:
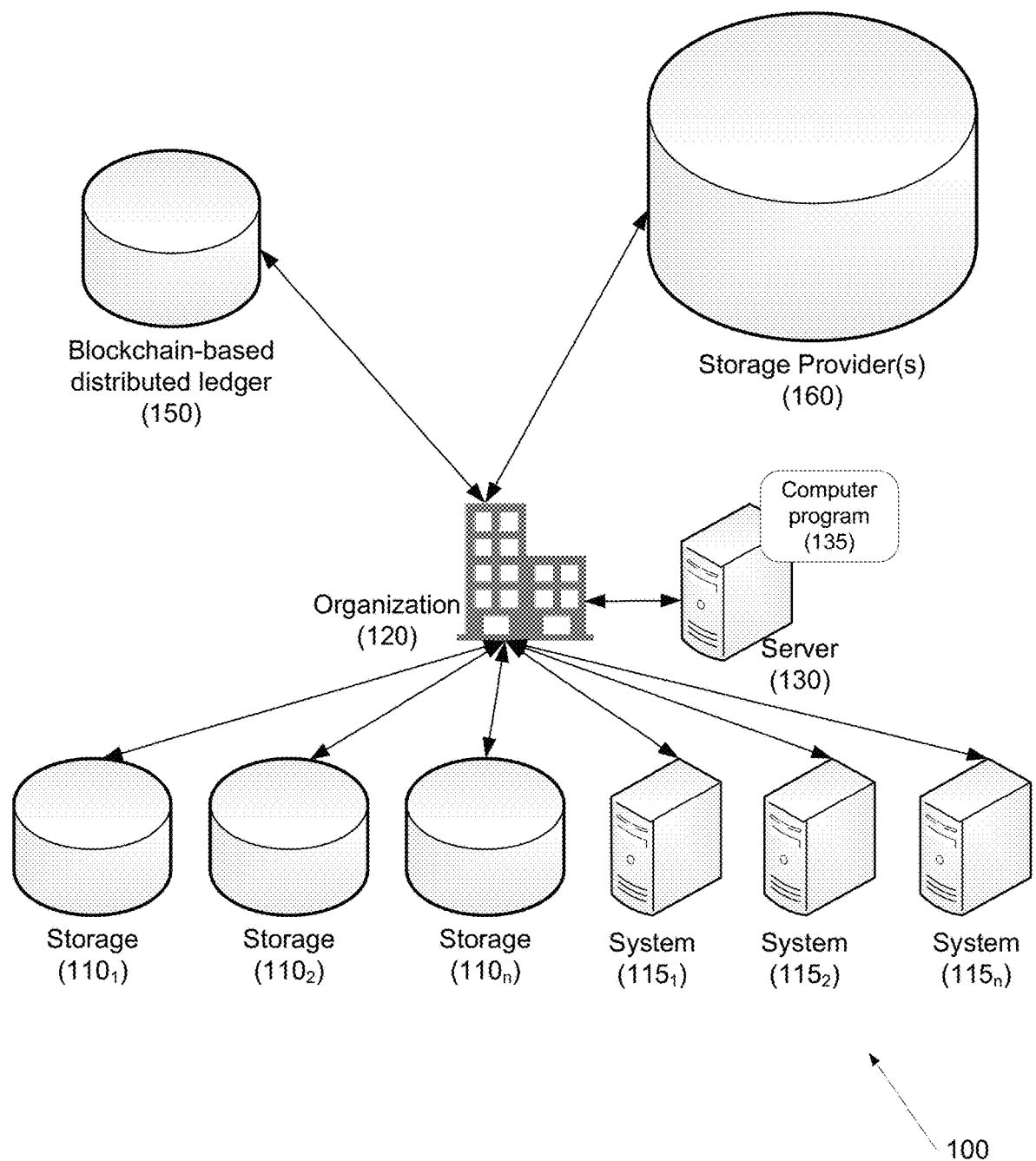
FIG. 1 depicts a system for blockchain-based secure storage according to one embodiment.

Referring to FIG. 1, a system for blockchain-based secure storage is provided according to one embodiment. System 110 may include organization 120 that may include storage $110_1, 110_2, \ldots 110_n$, one or more system 115, etc. In one embodiment, storage 110 may be any suitable storage, including local storage (e.g., network attached storage, local disk storage, etc.), cloud storage, etc.

Systems 115 may include notebook computers, desktop computers, workstations, portable computing devices, Internet of Things (IoT) devices, servers, etc.

Organization 120 may further include server 130 that executes computer program or computer application 135 for blockchain-based secure storage.

In one embodiment, computer program or computer application 135 may be deployed to each device (e.g., storage 110, system 115, etc.) from which data may be stored. Computer program or computer application 135 may provide on-system encryption that may be verified by the decentralized systems that comprise the peer-to-peer network.

Organization 120 may further interface with distributed ledger 150, which may be a blockchain technology-based distributed ledger, and one or more storage provide 160, which may be cloud-based storage providers (e.g., Microsoft Azure, Amazon Web Services, Google Cloud, etc.).

In one embodiment, storage providers 160 may provide S3-compliant storage.

In one embodiment, storage 110 and systems 115 may comprise a peer-to-peer network. In one embodiment, all storage 110 and systems 115 may reside within the organization; in another embodiment, some storage 110 and/or systems 115 may reside outside of an organization. This may provide a robust, fault-tolerant decentralized architecture.

In one embodiment, if the organization and/or storage 110 and systems 115 suddenly ceased to exist, the data which has been prior stored to the storage provider(s) 160 would still be accessible.

Figure 2:
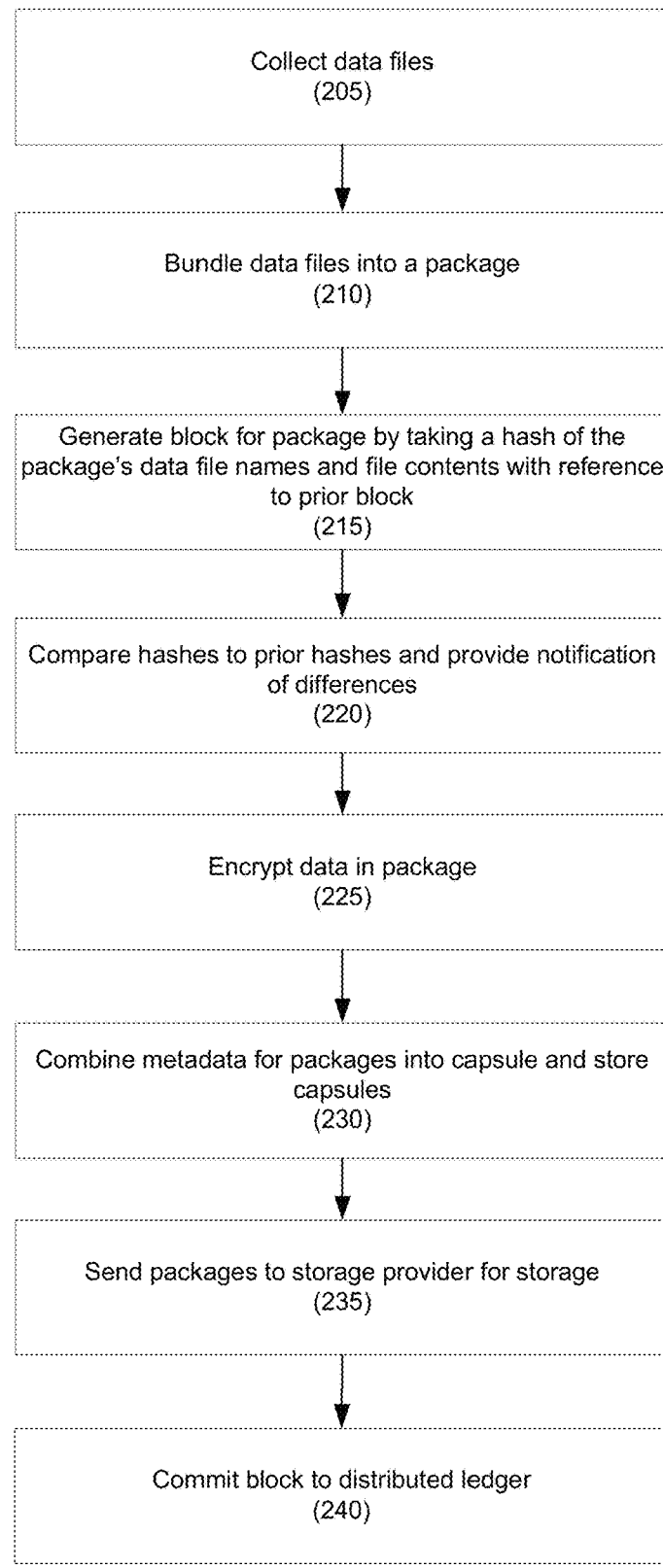
FIG. 2 depicts an method for blockchain-based secure storage according to one embodiment.

Referring to FIG. 2, a method for blockchain-based secure storage is provided according to one embodiment.

In step 205, data files may be collected. In one embodiment, the data files may include any type of data, including unstructured data, structured data, etc. Examples include data files, system files, program files, configuration files, etc. In one embodiment, the system may be agnostic to the type of data, and any data type may be collected as is necessary or desired.

In one embodiment, the data files may be collected periodically (e.g., hourly, daily, weekly, etc.), on demand, or as otherwise necessary and/or desired. In one embodiment, different data files or data file types may be collected at different intervals. In one embodiment, the data may be collected according to an organization's backup plan or policy.

In another embodiment, data files may be produced as a part of a software build orchestration process, or some other generic software build process, and this data may be pushed or ingested for storage.

In one embodiment, the data files may be collected by an agent that may operate within the network. In one embodiment, the agent, script, etc. may be executed by each device that manages storage within the network. In one embodiment, the agent may provide on-system encryption of the data in the data files.

In step 210, the data files may be bundled into a group. For example, the data files may be grouped according to creation date, modification date, file source, associated user(s), geographical location, file type, application type, access restrictions, etc.

In one embodiment, the data files may be bundled based on a historical grouping. For example, the same data, or substantially the same data, may be bundled together in each iteration.

In one embodiment, data files may not be bundled. For example, if a data file is above a certain size, the data may be treated individually.

In step 215, a block may be generated for the bundle. In one embodiment, the block may include a hash of each data file name in the bundle, a hash of the content of the data, and a reference to the preceding block (e.g., the last block written for the bundle of data), a nonce, and any other information as is necessary and/or desired.

In step 220, the hash(es) for the files may be compared to the preceding hash(es) for the files. A difference in either hash indicates a change in the file—either the file name, or the file contents. If there is a change in one or both hashes, a notification may be provided.

In one embodiment, the owners of the data (which may be cryptographically proven) and any other systems and/or team members may be notified of the change and, depending on said data owner's data notification preferences for the data in question, an action request as to whether the data should be allowed to be stored. In other words, the data owners, and any "team" members as defined by the data owners, hold some of the power of consensus. The other part of the consensus may be provided by the peer-to-peer network cryptographically verifying the data across a majority of the peers, as with a typical blockchain solution (Bitcoin, Ethereum, etc.).

In step 225, the data files may be encrypted. In one embodiment, any suitable encryption method may be used as is necessary and/or desired.

In step 230, metadata for the packages may be combined into a capsule. Examples of metadata may include a capsule ID (e.g., an ID of the capsule in SHA256 form, for correlation to distributed ledger (e.g., blockchain), packages, etc.); a nonce (e.g., the most recent block nonce); a hash (e.g., the most recent block's hash); a hash for the previous block), a name of the capsule (for logical reference), a channel (e.g., the "dev"/"test"/"prod" channel for logical reference), a capsule's creator ID, the date and time at which the capsule was created, the capsule public key, a yes/no as to whether capsule owners/team members will receive email notification upon new packages/blocks being added), etc. Other metadata may be included as is necessary and/or desired.

In one embodiment, the capsules may be considered to be a single, manageable parent unit for the packages. The capsules may be created by any user.

In one embodiment, the capsule may be stored in network attached storage, the cloud, or as otherwise necessary and/or desired.

In step 235, the packages may be sent to a storage provider for storage. In one embodiment, one or more storage provider may be used as is necessary and/or desired. In addition, the same storage provider need not be used for subsequent packages. For example, packages for a given cycle may be stored with storage provider A, and packages for the next cycle may be stored with storage provider B. The selection of storage providers may depend on cost, speed, size of capsules, security, ease of retrieval, dependability, location etc.

In one embodiment, the system may automatically select the storage provider for the packages. In one embodiment, a user may provide one or more objective (e.g., lowest cost), and the system may select the storage provider with the lowest cost for the capsule. If the pricing or objective changes, the system may select a different storage provider.

In step 240, the block may be committed to a distributed ledger. For example, in one embodiment, the block may be submitted to the other peers in the network, and a consensus model may be used to commit the block to the distributed ledger.

In one embodiment, each capsule may have its own distributed ledger, so that the blocks for each capsule are written only to that capsule's distributed ledger. The separation of capsule distributed ledger(s) may provide an added level of security over a single distributed ledger for all capsules approach. Thus, a specific application may have its own capsule (e.g., a distributed ledger) that may only be able to be appended by team members of that capsule (which may be cryptographically proven).

In another embodiment, the capsule may also be written to the capsule's distributed ledger. For example, the block may include an indicator that indicates the block type as well as the data for that block type. If the block type is a package addition, the block may then contain the aforementioned in addition to the package block contents described above (e.g., first hash of file name, second hash of file contents for the plurality of the data); if the block type indicates an alteration (e.g., create, change, delete, etc.) of the metadata of the capsule, the block may then contain the aforementioned in addition to the metadata being updated and an identification of the user or system requesting the alteration. Other block types may be used as is necessary and/or desired.

This may provide immutability and cryptographically-provable auditability of the capsule metadata over time or over the course of the data's lifespan.

In one embodiment, RSA key pairs (or similar) may be used to by the data owners to define "team" members. For example, each capsule may have a defined public/private key pair, which may be used to encrypt the AES-256-CBC Key and IV of the packages. The capsule-public-key-encrypted AES-256-CBC Key and IV may then be encrypted again using a "team" member's individual public/private key. This provides an extra level of security while allowing the formation of a "team" as defined by the data owner.

Other encryption technique, keys, and/or IVs may be used as is necessary and/or desired.

In one embodiment, a user that is a part of a defined "team" may obtain unique, personally-generated encrypted package Key and IV (secrets) that may be decrypted using a combination of his/her/its private key and the capsule's (e.g., the "team's") private key.

It should be recognized that although several embodiments have been disclosed, these embodiments are not exclusive and aspects of one embodiment may be applicable to other embodiments.

Hereinafter, general aspects of implementation of the systems and methods of the invention will be described.

The system of the invention or portions of the system of the invention may be in the form of a "processing machine," such as a general purpose computer, for example. As used herein, the term "processing machine" is to be understood to include at least one processor that uses at least one memory.

The at least one memory stores a set of instructions. The instructions may be either permanently or temporarily stored in the memory or memories of the processing machine. The processor executes the instructions that are stored in the memory or memories in order to process data. The set of instructions may include various instructions that perform a particular task or tasks, such as those tasks described above. Such a set of instructions for performing a particular task may be characterized as a program, software program, or simply software.

In one embodiment, the processing machine may be a specialized processor.

As noted above, the processing machine executes the instructions that are stored in the memory or memories to process data. This processing of data may be in response to commands by a user or users of the processing machine, in response to previous processing, in response to a request by another processing machine and/or any other input, from automated scheduling, for example.

As noted above, the processing machine used to implement the invention may be a general purpose computer. However, the processing machine described above may also utilize any of a wide variety of other technologies including a special purpose computer, a computer system including, for example, a microcomputer, mini-computer or mainframe, a programmed microprocessor, a micro-controller, a peripheral integrated circuit element, a CSIC (Customer Specific Integrated Circuit) or ASIC (Application Specific Integrated Circuit) or other integrated circuit, a logic circuit, a digital signal processor, a programmable logic device such as a FPGA, PLD, PLA or PAL, or any other device or arrangement of devices that is capable of implementing the steps of the processes of the invention.

The processing machine used to implement the invention may utilize a suitable operating system. Thus, embodiments of the invention may include a processing machine running the iOS operating system, the OS X operating system, the Android operating system, the Microsoft Windows™ operating systems, the Unix operating system, the Linux operating system, the Xenix operating system, the IBM AIX™ operating system, the Hewlett-Packard UX™ operating system, the Novell Netware™ operating system, the Sun Microsystems Solaris™ operating system, the OS/2™ operating system, the BeOS™ operating system, the Macintosh operating system, the Apache operating system, an OpenStep™ operating system or another operating system or platform.

It is appreciated that in order to practice the method of the invention as described above, it is not necessary that the processors and/or the memories of the processing machine be physically located in the same geographical place. That is, each of the processors and the memories used by the processing machine may be located in geographically distinct locations and connected so as to communicate in any suitable manner. Additionally, it is appreciated that each of the processor and/or the memory may be composed of different physical pieces of equipment. Accordingly, it is not necessary that the processor be one single piece of equipment in one location and that the memory be another single piece of equipment in another location. That is, it is contemplated that the processor may be two pieces of equipment in two different physical locations. The two distinct pieces of equipment may be connected in any suitable manner. Additionally, the memory may include two or more portions of memory in two or more physical locations.

To explain further, processing, as described above, is performed by various components and various memories.

However, it is appreciated that the processing performed by two distinct components as described above may, in accordance with a further embodiment of the invention, be performed by a single component. Further, the processing performed by one distinct component as described above may be performed by two distinct components. In a similar manner, the memory storage performed by two distinct memory portions as described above may, in accordance with a further embodiment of the invention, be performed by a single memory portion. Further, the memory storage performed by one distinct memory portion as described above may be performed by two memory portions.

Further, various technologies may be used to provide communication between the various processors and/or memories, as well as to allow the processors and/or the memories of the invention to communicate with any other entity; i.e., so as to obtain further instructions or to access and use remote memory stores, for example. Such technologies used to provide such communication might include a network, the Internet, Intranet, Extranet, LAN, an Ethernet, wireless communication via cell tower or satellite, or any client server system that provides communication, for example. Such communications technologies may use any suitable protocol such as TCP/IP, UDP, or OSI, for example.

As described above, a set of instructions may be used in the processing of the invention. The set of instructions may be in the form of a program or software. The software may be in the form of system software or application software, for example. The software might also be in the form of a collection of separate programs, a program module within a larger program, or a portion of a program module, for example. The software used might also include modular programming in the form of object oriented programming. The software tells the processing machine what to do with the data being processed.

Further, it is appreciated that the instructions or set of instructions used in the implementation and operation of the invention may be in a suitable form such that the processing machine may read the instructions. For example, the instructions that form a program may be in the form of a suitable programming language, which is converted to machine language or object code to allow the processor or processors to read the instructions. That is, written lines of programming code or source code, in a particular programming language, are converted to machine language using a compiler, assembler or interpreter. The machine language is binary coded machine instructions that are specific to a particular type of processing machine, i.e., to a particular type of computer, for example. The computer understands the machine language.

Any suitable programming language may be used in accordance with the various embodiments of the invention. Illustratively, the programming language used may include assembly language, Ada, APL, Basic, C, C++, COBOL, dBase, Forth, Fortran, Java, Modula-2, Pascal, Prolog, REXX, Visual Basic, and/or JavaScript, Phyton, for example. Further, it is not necessary that a single type of instruction or single programming language be utilized in conjunction with the operation of the system and method of the invention. Rather, any number of different programming languages may be utilized as is necessary and/or desirable.

Also, the instructions and/or data used in the practice of the invention may utilize any compression or encryption technique or algorithm, as may be desired. An encryption module might be used to encrypt data. Further, files or other data may be decrypted using a suitable decryption module, for example.

As described above, the invention may illustratively be embodied in the form of a processing machine, including a computer or computer system, for example, that includes at least one memory. It is to be appreciated that the set of instructions, i.e., the software for example, that enables the computer operating system to perform the operations described above may be contained on any of a wide variety of media or medium, as desired. Further, the data that is processed by the set of instructions might also be contained on any of a wide variety of media or medium. That is, the particular medium, i.e., the memory in the processing machine, utilized to hold the set of instructions and/or the data used in the invention may take on any of a variety of physical forms or transmissions, for example. Illustratively, the medium may be in the form of paper, paper transparencies, a compact disk, a DVD, an integrated circuit, a hard disk, a floppy disk, an optical disk, a magnetic tape, a RAM, a ROM, a PROM, an EPROM, a wire, a cable, a fiber, a communications channel, a satellite transmission, a memory card, a SIM card, or other remote transmission, as well as any other medium or source of data that may be read by the processors of the invention.

Further, the memory or memories used in the processing machine that implements the invention may be in any of a wide variety of forms to allow the memory to hold instructions, data, or other information, as is desired. Thus, the memory might be in the form of a database to hold data. The database might use any desired arrangement of files such as a flat file arrangement or a relational database arrangement, for example.

In the system and method of the invention, a variety of "user interfaces" may be utilized to allow a user to interface with the processing machine or machines that are used to implement the invention. As used herein, a user interface includes any hardware, software, or combination of hardware and software used by the processing machine that allows a user to interact with the processing machine. A user interface may be in the form of a dialogue screen for example. A user interface may also include any of a mouse, touch screen, keyboard, keypad, voice reader, voice recognizer, dialogue screen, menu box, list, checkbox, toggle switch, a pushbutton or any other device that allows a user to receive information regarding the operation of the processing machine as it processes a set of instructions and/or provides the processing machine with information. Accordingly, the user interface is any device that provides communication between a user and a processing machine. The information provided by the user to the processing machine through the user interface may be in the form of a command, a selection of data, or some other input, for example.

As discussed above, a user interface is utilized by the processing machine that performs a set of instructions such that the processing machine processes data for a user. The user interface is typically used by the processing machine for interacting with a user either to convey information or receive information from the user. However, it should be appreciated that in accordance with some embodiments of the system and method of the invention, it is not necessary that a human user actually interact with a user interface used by the processing machine of the invention. Rather, it is also contemplated that the user interface of the invention might interact, i.e., convey and receive information, with another processing machine, rather than a human user. Accordingly, the other processing machine might be characterized as a user. Further, it is contemplated that a user interface utilized in the system and method of the invention may interact partially with another processing machine or processing machines, while also interacting partially with a human user.

It will be readily understood by those persons skilled in the art that the present invention is susceptible to broad utility and application. Many embodiments and adaptations of the present invention other than those herein described, as well as many variations, modifications and equivalent arrangements, will be apparent from or reasonably suggested by the present invention and foregoing description thereof, without departing from the substance or scope of the invention.

Accordingly, while the present invention has been described here in detail in relation to its exemplary embodiments, it is to be understood that this disclosure is only illustrative and exemplary of the present invention and is made to provide an enabling disclosure of the invention. Accordingly, the foregoing disclosure is not intended to be construed or to limit the present invention or otherwise to exclude any other such embodiments, adaptations, variations, modifications or equivalent arrangements.

What is claimed is:

1. A method for blockchain-based secure storage, comprising:
   in an information processing apparatus comprising at least one computer processor:
      receiving a plurality of data files from a data file source;
      bundling the plurality of data files into a package, wherein the data files are bundled in the package based on a type of data in the data files and based on a user associated with the data files;
      generating a first hash for each file name for each of the plurality of data files, and a second hash for contents of each of the plurality of data files;
      generating a block comprising the first hash, the second hash, and a reference to a prior block;
      encrypting each of the plurality of data files in the package;
      sending the package to a storage provider;
      committing the block to a distributed ledger;
      combining metadata for a plurality of packages, including the package, into a capsule wherein the metadata comprises a public key for the capsule, and a notification indication, and wherein the notification indication includes a notification preference of the user associated with the data files;
      storing the capsule; and
      providing a private key that corresponds to the public key to the user associated with the data files.

2. The method of claim 1, wherein the data files are bundled based on a source of data in the data files.

3. The method of claim 1, wherein the data files are bundled based on an application associated with the data files.

4. The method of claim 1, further comprising:
   selecting the storage provider from a plurality of storage providers.

5. The method of claim 1, wherein the metadata comprises at least one of a capsule ID, a nonce, a hash of the block, a hash of the prior block, and a date and time of capsule creation.

6. The method of claim 1, wherein the notification indication includes an electronic mail address of the user associated with the data files.

7. The method of claim 1, wherein the notification indication includes an indication that the user associated with the data files will receive a notification when a new block based on the package is added to the distributed ledger.

8. A system for blockchain-based secure storage, comprising:
   a data file source;
   a distributed ledger;
   a storage provider; and
   an information processing apparatus comprising at least one computer processor and executing a computer program;
   wherein:
      the computer program receives a plurality of data files from the data file source;
      the computer program bundles the plurality of data files into a package, and wherein the data files are bundled in the package based on a type of data in the data files and based on a user associated with the data files;
      the computer program generates a first hash for each file name for each of the plurality of data files, and a second hash for contents of each of the plurality of data files;
      the computer program generates a block comprising the first hash, the second hash, and a reference to a prior block;
      the computer program encrypts each of the plurality of data files in the package;
      the computer program sends the package to the storage provider;
      the computer program commits the block to the distributed ledger;
      the computer program combines metadata for a plurality of packages, including the package, into a capsule wherein the metadata comprises a public key for the capsule, and a notification indication, and wherein the notification indication includes a notification preference of the user associated with the data files;
      the computer program stores the capsule; and
      the computer program provides a private key that corresponds to the public key to the user associated with the data files.

9. The system of claim 8, wherein the data files are bundled based on a source of data in the data files.

10. The system of claim 8, wherein the data files are bundled based on an application associated with the data files.

11. The system of claim 8, wherein the computer program further selects the storage provider from a plurality of storage providers.

12. The system of claim 8, wherein the metadata comprises at least one of a capsule ID, a nonce, a hash of the block, a hash of the prior block, and a date and time of capsule creation.

13. The system of claim 8, wherein the notification indication includes an electronic mail address of the user associated with the data files.

14. The system of claim 8, wherein the notification indication includes an indication that the user associated with the data files will receive a notification when a new block based on the package is added to the distributed ledger.

* * * * *